US010017069B2

(12) United States Patent
Lim et al.

(10) Patent No.: US 10,017,069 B2
(45) Date of Patent: Jul. 10, 2018

(54) METHOD FOR CONTROLLING BATTERY OUTPUT

(71) Applicants: HYUNDAI MOTOR COMPANY, Seoul (KR); KIA MOTORS CORPORATION, Seoul (KR)

(72) Inventors: Do Kyoung Lim, Suwon-si (KR); Jae Hoon Choi, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 31 days.

(21) Appl. No.: 15/264,990

(22) Filed: Sep. 14, 2016

(65) Prior Publication Data

US 2017/0144563 A1 May 25, 2017

(30) Foreign Application Priority Data

Nov. 24, 2015 (KR) ........................ 10-2015-0165014

(51) Int. Cl.
*H02J 7/00* (2006.01)
*B60L 11/18* (2006.01)

(52) U.S. Cl.
CPC ....... *B60L 11/1862* (2013.01); *B60L 11/1874* (2013.01); *H02J 7/0021* (2013.01); *H02J 7/0063* (2013.01); *B60L 2210/10* (2013.01); *B60L 2240/622* (2013.01); *H02J 2007/005* (2013.01)

(58) Field of Classification Search
CPC .. H02J 7/0021; H02J 7/0063; H02J 2007/005; B60L 11/1874; B60L 11/1862; B60L 2210/10; B60L 2240/622
USPC ........................................ 320/134, 104, 164
See application file for complete search history.

(56) References Cited

U.S. PATENT DOCUMENTS

| | | | | |
|---|---|---|---|---|
| 7,362,074 | B2 * | 4/2008 | Iwane | G01R 31/3662 320/132 |
| 9,685,807 | B2 * | 6/2017 | Nakao | H02J 7/0057 |
| 9,815,383 | B2 * | 11/2017 | Komiyama | B60L 11/1862 |
| 9,867,575 | B2 * | 1/2018 | Maani | A61B 5/721 |
| 2003/0231006 | A1 | 12/2003 | Tojima | |
| 2005/0088148 | A1 * | 4/2005 | Kubo | G01R 31/3679 320/137 |
| 2006/0066285 | A1 * | 3/2006 | Minamiura | G01R 31/3662 320/132 |

(Continued)

FOREIGN PATENT DOCUMENTS

| | | |
|---|---|---|
| JP | 2004-022183 A | 1/2004 |
| JP | 2007048485 A | 2/2007 |

(Continued)

OTHER PUBLICATIONS

Office Action issued in corresponding Korean Patent Application No. 10-2015-0165014, dated Aug. 25, 2017.

*Primary Examiner* — Phallaka Kik
(74) *Attorney, Agent, or Firm* — McDermott Will & Emery LLP

(57) ABSTRACT

A method for controlling an output of a battery includes measuring a state of charge (SOC) or a resistance of the battery of a vehicle, comparing a deterioration level of the battery with a set deterioration level, and controlling a temperature of the battery, an average output of the battery, and a load mode of the battery when the deterioration level of the battery is larger than the set deterioration level.

8 Claims, 1 Drawing Sheet

START
MEASURE SOC OR RESISTANCE OF BATTERY — S100
DECIDE DETERIORATION DEGREE OF BATTERY — S110
S120 DETERIORATION DEGREE > REFERENCE DETERIORATION DEGREE? — No / Yes
CONFIRM TEMPERATURE OF BATTERY — S130
S140 TEMPERATURE > LIMIT TEMPERATURE? — Yes / No
S150 COOL BATTERY
CONFIRM AVERAGE OUTPUT OF BATTERY IN PREDETERMINED TIME — S170
S180 OUTPUT > LIMIT OUTPUT? — Yes / No
CONFIRM SPEED AND LOAD OF VEHICLE USING GPS — S190
S210 LIMIT OUTPUT (CURRENT) OF BATTERY
S160, S220 DECREASE VOLTAGE RANGE OF TURN-ON OR TURN-OFF MODE FOR CHARGING OR DISCHARGING BATTERY
S200 ARE SPEED AND LOAD OF VEHICLE IN HIGH LOAD MODE? — Yes / No
END

(56) References Cited

U.S. PATENT DOCUMENTS

2010/0000809 A1* 1/2010 Nishi .................... B60K 6/445 180/65.29
2010/0001693 A1* 1/2010 Iida .................... G01R 31/3679 320/134
2010/0156356 A1* 6/2010 Asakura ................ H01M 10/44 320/148
2012/0013304 A1* 1/2012 Murase ............... B60L 11/1864 320/116
2012/0025613 A1* 2/2012 Morita ..................... B60L 3/00 307/64
2012/0049804 A1* 3/2012 Kobayashi .......... H01M 10/441 320/150
2012/0256569 A1* 10/2012 Kawahara ........... H01M 10/486 318/139
2013/0088201 A1* 4/2013 Iwasawa ............ G01R 31/3679 320/118
2014/0097676 A1* 4/2014 Kusumi .................. H02J 7/045 307/10.1
2014/0176085 A1* 6/2014 Maruno ............. G01R 31/3679 320/162
2014/0200755 A1* 7/2014 Sisk ....................... B60L 11/12 701/22
2014/0320144 A1* 10/2014 Nakaya ................. H01M 10/54 324/434
2014/0339891 A1 11/2014 Ohkawa et al.
2014/0353055 A1* 12/2014 Kronfeld ............... B60L 11/007 180/65.31
2015/0057957 A1 2/2015 Kim
2015/0293182 A1* 10/2015 Tajima .................. H01M 10/48 701/22
2015/0349387 A1* 12/2015 Inaba .................... H01M 10/44 700/297
2015/0357852 A1* 12/2015 Nakao ................ G01R 31/3624 320/162
2017/0129361 A1* 5/2017 Scaringe ............. B60L 11/1861
2018/0003855 A1* 1/2018 Aloe ...................... A61B 5/681

FOREIGN PATENT DOCUMENTS

JP 2012-200075 A 10/2012
KR 10-2010-0063347 A 6/2010
KR 10-2015-0022345 A 3/2015
KR 10-1530679 B1 6/2015
WO 2013094057 A1 6/2013

* cited by examiner

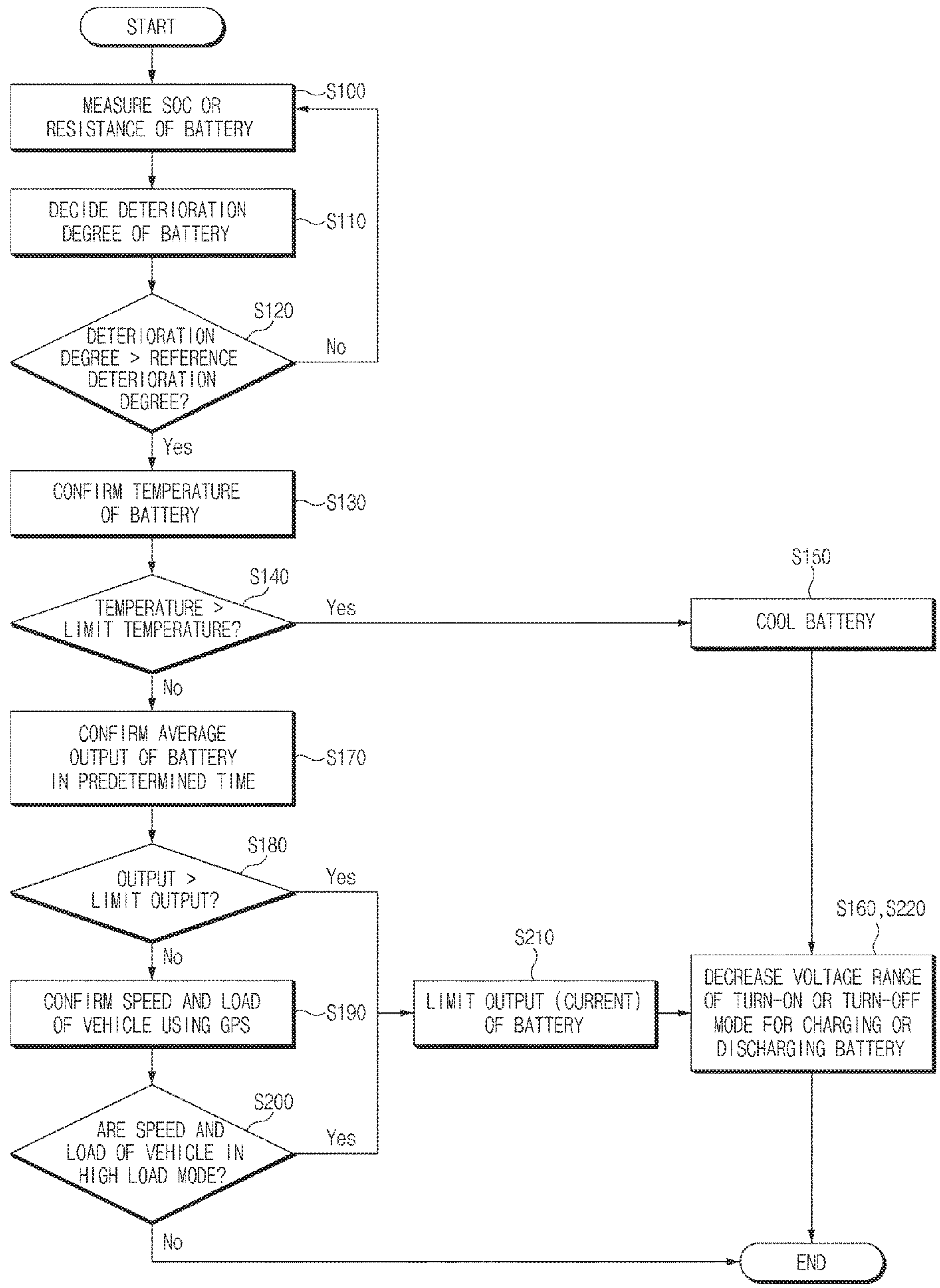
START
MEASURE SOC OR RESISTANCE OF BATTERY
S100
DECIDE DETERIORATION DEGREE OF BATTERY
S110
S120
DETERIORATION DEGREE > REFERENCE DETERIORATION DEGREE?
No
Yes
CONFIRM TEMPERATURE OF BATTERY
S130
S140
TEMPERATURE > LIMIT TEMPERATURE?
Yes
S150
COOL BATTERY
No
CONFIRM AVERAGE OUTPUT OF BATTERY IN PREDETERMINED TIME
S170
S180
OUTPUT > LIMIT OUTPUT?
Yes
No
CONFIRM SPEED AND LOAD OF VEHICLE USING GPS
S190
S210
LIMIT OUTPUT (CURRENT) OF BATTERY
S160,S220
DECREASE VOLTAGE RANGE OF TURN-ON OR TURN-OFF MODE FOR CHARGING OR DISCHARGING BATTERY
S200
ARE SPEED AND LOAD OF VEHICLE IN HIGH LOAD MODE?
Yes
No
END

METHOD FOR CONTROLLING BATTERY OUTPUT

CROSS-REFERENCE TO RELATED APPLICATION

This application claims the benefit of priority to Korean Patent Application No. 10-2015-0165014, filed on Nov. 24, 2015 with the Korean Intellectual Property Office, the disclosure of which is incorporated herein in its entirety by reference.

TECHNICAL FIELD

The present disclosure relates to a method for controlling an output of a battery, and more particularly, to a technology for controlling an output of a battery by deciding a deterioration level of a battery of a vehicle and monitoring a current state of the battery.

BACKGROUND

In recent years, an interest in the development of eco-friendly energy has increased. A pure electric vehicle using a battery as an energy source, an engine hybrid electric vehicle and a fuel cell hybrid electric vehicle using the battery as an energy buffer, and the like, have also been intensively developed in the vehicle field.

In the hybrid vehicle described above, a battery system is one of the main components in determining a quality or utility of the vehicle. The battery system of the hybrid vehicle is an energy source of the vehicle that assists in an output of an engine during driving of the vehicle or in accumulating generated energy therein, and a technology for controlling and monitoring the battery system is important.

Technologies for controlling the battery system include a power controlling technology, a cooling technology, a diagnosing technology, a technology of estimating a state of charge (SOC) of a battery, and the like. Among them, the technology of estimating an SOC of a battery is directly used for the purpose of determining a driving strategy of the vehicle.

In addition, in the hybrid vehicle, the SOC of the battery is calculated to control charging and discharging of the battery, thereby making it possible to improve operational efficiency of the vehicle.

In addition, the battery becomes deteriorated depending on a use environment or a use period, such that an available capacity of the battery is decreased or a resistance of the battery is increased. Therefore, a state of health (hereinafter, referred to as a 'SOH'), which is a performance of the battery, is deteriorated as compared with that of a newer battery.

That is, a current battery system performs the charging or the discharging on the basis of only an estimated SOC and a voltage of the battery, and thus, a technology for limiting a use range, an output, or the like, of the battery depending on a deterioration state of the battery is needed.

SUMMARY

The present disclosure has been made to solve the above-mentioned problems occurring in the prior art while advantages achieved by the prior art are maintained intact.

An aspect of the present disclosure provides a method for controlling an output of a battery capable of securing durability of a battery by deciding a deterioration level of a battery of a vehicle and controlling factors affecting a current deterioration level of the battery, including a temperature, a use range, or a use current in a case in which the deterioration level of the battery is large.

Other objects and advantages of the present disclosure may be understood by the following description and will be more clearly appreciated by exemplary embodiments of the present disclosure. It may be easily appreciated that objects and advantages of the present disclosure may be realized by means mentioned in the claims and combinations thereof.

According to an exemplary embodiment of the present disclosure, a method for controlling an output of a battery may include: measuring a state of charge (SOC) or a resistance of the battery of a vehicle; comparing a deterioration level of the battery with a set deterioration level; and controlling a temperature of the battery, an average output of the battery, and a load mode of the battery when the deterioration level of the battery is larger than the set deterioration level.

The step of controlling the temperature of the battery may include: comparing the temperature of the battery with a set temperature; and cooling the battery when the temperature of the battery is larger than the set temperature.

The step of controlling the average output of the battery may include: comparing the average output of the battery with a set output; and limiting the output of the battery when the average output of the battery is larger than the set output.

The step of controlling the load mode of the battery may include: confirming a speed of the vehicle and a load of the vehicle using a global positioning system (GPS) of the vehicle; deciding whether or not the speed of the vehicle and the load of the vehicle are in a high load mode; and limiting the output of the battery when the speed of the vehicle and the load of the vehicle are in the high load mode.

The step of controlling the average output of the battery or the controlling of the load mode of the battery may further include, after the limiting of the output of the battery, adjusting a voltage range of the battery for charging or discharging the battery.

In the step of comparing the deterioration level of the battery with the set deterioration level, the deterioration level of the battery may be decided on the basis of a lifespan of the battery, and be calculated using a battery deterioration map in which a driving distance and a driving time of the vehicle are reflected.

After the step of limiting the output of the battery, a voltage may be output by a low voltage direct current (DC) to DC converter (LDC) or an alternator.

The deterioration level of the battery may be decided by comparing a change rate of the measured SOC of the battery with a set change rate of an SOC of the battery.

BRIEF DESCRIPTION OF THE DRAWINGS

The above and other objects, features and advantages of the present disclosure will be more apparent from the following detailed description taken in conjunction with the accompanying drawings.

FIG. 1 is a flowchart for describing a method for controlling an output of a battery depending on deterioration of the battery according to an exemplary embodiment of the present disclosure.

DETAILED DESCRIPTION

Advantages and features of the present disclosure and methods accomplishing them will become apparent from exemplary embodiments described below in detail with reference to the accompanying drawings. However, the present disclosure is not limited to exemplary embodiments described herein, but may be implemented in other forms. These exemplary embodiments are provided in order to describe the present disclosure in detail so that those skilled in the art to which the present disclosure pertains may easily practice the spirit of the present disclosure.

In the accompanying drawings, exemplary embodiments of the present disclosure are not limited to illustrated specific forms, but are exaggerated for the purpose of clarity. Although specific terms have been used in the present specification, they are merely used in order to describe the present disclose and are not used in order to limit the meaning or the scope of the present disclosure, which is disclosed in the appended claims.

In the present specification, a term 'and/or' is used as the meaning including at least one of components arranged before and after the term. In addition, the terms 'connected/coupled' are used as meaning that any component is directly connected to another component or is indirectly connected to another component through the other component. Unless explicitly described to the contrary, a singular form includes a plural form in the present specification. In addition, components, steps, operations, and elements mentioned by terms 'include' or 'including' used in the present specification mean the existence or addition of one or more other components, steps, operations and elements.

Hereinafter, an exemplary embodiment of the present disclosure will be described in detail with reference to the accompanying drawings.

FIG. 1 is a flowchart for describing a method for controlling an output of a battery depending on deterioration of the battery according to an exemplary embodiment of the present disclosure.

Referring to FIG. 1, a battery controlling system may control an output of a battery depending on a deterioration level of the battery.

First, the battery controlling system may measure a state of charge (SOC) of the battery or a resistance generated in the battery (S100).

Next, the battery controlling system may decide a deterioration level of the battery on the basis of the measured SOC or resistance of the battery (S110). That is, the battery controlling system may decide the deterioration level of the battery by comparing a change rate of the measured SOC of the battery with a set change rate of an SOC of the battery.

Next, the battery controlling system may compare the deterioration level of the battery decided in real time with a set deterioration level (a reference deterioration level) (S120).

Here, the set deterioration level of the battery may be decided on the basis of a lifespan of the battery, and may be calculated using a battery deterioration map in which a driving distance and a driving time of a vehicle are reflected.

In detail, the battery controlling system may calculate a remaining driving distance by which the vehicle may be driven depending on a deterioration level calculated through the battery deterioration map for a driving distance of the vehicle, and may calculate a remaining driving time in which the vehicle may be driven depending on a deterioration level calculated through the battery deterioration map for a driving time of the vehicle.

Next, when the deterioration level of the battery is larger than the set deterioration level, the battery controlling system may confirm a temperature of the battery (S130).

Next, when the temperature of the battery is larger than a set temperature (a reference temperature or a limit temperature), the battery controlling system may cool the battery to a temperature lower than a general cooling temperature (S140 and S150), which may be a pre-set temperature.

Next, the battery controlling system may decrease a voltage range of a turn-on or turn-off mode for charging or discharging the battery (S160) after adjusting the temperature of the battery to a low temperature, or a cooled or a pre-set temperature.

That is, the battery controlling system may decrease a voltage range of the battery in a charging or discharging control mode of the battery for maximizing a fuel efficiency effect at the time of a turn-on or turn-off operation of a low voltage direct current DC to DC converter (LDC).

Next, when the temperature of the battery is lower than the set temperature (the reference temperature or the limit temperature or the cool temperature) at step 140, the battery controlling system may confirm an average output (an average output value) of the battery in a predetermined time (a set time) (S170).

Here, the average output of the battery may be calculated using a maximum output value and a minimum output value at the time of providing an output from the battery to an electric load.

Next, the battery controlling system may compare the average output of the battery with a set output (a reference output or a limit output), and confirm a speed of the vehicle and a load of the vehicle using a global positioning system (GPS) when the average output of the battery is smaller than the set output (S180 and S190).

Next, when the average output of the battery is larger than the set output or the speed of the vehicle and the load of the vehicle are in a high load mode, the battery controlling system may limit the output of the battery, and decrease the voltage range of the turn-on or turn-off mode for charging or discharging the battery (S200 to S220).

Here, the case in which the speed of the vehicle and the load of the vehicle are in the high load mode may mean a vehicle driving condition including a case in which the vehicle is rapidly accelerated, a case in which the vehicle is rapidly decelerated, or a case in which a large output is generated in the electric load of the vehicle.

Here, even though the output of the battery is limited due to the deterioration of the battery, various controllers or other components such as an LDC or an alternator connected to an inverter for driving a motor, which are provided in the vehicle, may output a voltage.

As described above, according to an exemplary embodiment of the present disclosure, a use amount of the battery is maximized, thereby making it possible to improve fuel, or energy, efficiency of the vehicle.

In addition, according to an exemplary embodiment of the present disclosure, the temperature of the battery is adjusted and the use range of the battery is limited after a state and deterioration elements of the battery are monitored so as to adjust a deterioration speed of the battery, thereby making it possible to secure increased durability of the battery.

Further, according to an exemplary embodiment of the present disclosure, the deterioration, or deterioration rate, of the battery is decreased, thereby making it possible to decrease a cost required for the driver to replace the battery or repair the battery.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling an output of a battery, comprising:

measuring a state of charge (SOC) or a resistance of the battery of a vehicle;

computing a deterioration level based on the measured SOC or the resistance of the battery;

comparing the deterioration level of the battery with a set deterioration level; and controlling a temperature of the battery, an average output of the battery, and a load mode of the battery when the deterioration level of the battery is larger than the set deterioration level, wherein the step of controlling the load mode of the battery includes:

confirming a speed of the vehicle and a load of the vehicle using a global positioning system (GPS) of the vehicle;

deciding whether or not the speed of the vehicle and the load of the vehicle are in a high load mode; and limiting the output of the battery when the speed of the vehicle and the load of the vehicle are in the high load mode.

2. The method for controlling an output of a battery according to claim 1, wherein the step of controlling the temperature of the battery includes:

comparing the temperature of the battery with a set temperature; and cooling the battery when the temperature of the battery is larger than the set temperature.

3. The method for controlling an output of a battery according to claim 1, wherein the step of controlling the average output of the battery includes:

comparing the average output of the battery with a set output; and limiting the output of the battery when the average output of the battery is larger than the set output.

4. The method for controlling an output of a battery according to claim 3, wherein after the step of limiting the output of the battery, a voltage range of the battery is adjusted for charging or discharging the battery.

5. The method for controlling an output of a battery according to claim 4, wherein after the step of limiting the output of the battery, a voltage is output by a low voltage direct current (DC) to DC converter (LDC) or an alternator.

6. The method for controlling an output of a battery according to claim 1, wherein in the step of comparing the deterioration level of the battery with the set deterioration level, the deterioration level of the battery is decided on the basis of a lifespan of the battery, and is calculated using a battery deterioration map in which a driving distance and a driving time of the vehicle are reflected.

7. The method for controlling an output of a battery according to claim 1, wherein the deterioration level of the battery is decided by comparing a change rate of the measured SOC of the battery with a set change rate of an SOC of the battery.

8. The method for controlling an output of a battery according to claim 1, wherein after the step of limiting the output of the battery, a voltage range of the battery is adjusted for charging or discharging the battery.

* * * * *